United States Patent
Lee, Jr. et al.

(10) Patent No.: US 11,802,585 B2
(45) Date of Patent: Oct. 31, 2023

(54) ANTI-TAMPERING DEVICE THAT ENVELOPES THE HEAD OF A FASTENER

(71) Applicants: Ronald Lee, Jr., Ruskin, FL (US); Anthony Sansone, Parrish, FL (US)

(72) Inventors: Ronald Lee, Jr., Ruskin, FL (US); Anthony Sansone, Parrish, FL (US)

(73) Assignee: Dynamic Manufacturing Group LLC, Palmetto, FL (US)

( * ) Notice: Subject to any disclaimer, the term of this patent is extended or adjusted under 35 U.S.C. 154(b) by 448 days.

(21) Appl. No.: 16/948,250

(22) Filed: Sep. 10, 2020

(65) Prior Publication Data

US 2022/0074444 A1    Mar. 10, 2022

(51) Int. Cl.
| | | |
|---|---|---|
| *F16B 39/02* | (2006.01) | |
| *F16B 39/22* | (2006.01) | |
| *F16B 37/14* | (2006.01) | |
| *F16B 41/00* | (2006.01) | |
| *F16B 21/12* | (2006.01) | |

(52) U.S. Cl.
CPC .............. *F16B 39/02* (2013.01); *F16B 21/12* (2013.01); *F16B 37/14* (2013.01); *F16B 39/22* (2013.01); *F16B 41/005* (2013.01)

(58) Field of Classification Search
CPC ...... F16B 41/005; F16B 37/14; F16B 35/005; F16B 39/02; F16B 21/12; F16B 39/22; F16B 21/165; Y10T 70/5854; Y10T 70/5858; Y10T 70/5863; Y10T 70/5867; E05B 73/0076; B62D 53/085
USPC .................................... 411/910, 393; 70/232
See application file for complete search history.

(56) References Cited

U.S. PATENT DOCUMENTS

| | | | | |
|---|---|---|---|---|
| 1,645,917 A | * | 10/1927 | Maszczyk | ............... B60R 25/00 301/11.2 |
| 1,678,174 A | * | 7/1928 | White | .................... F16B 41/005 70/231 |
| 1,881,866 A | * | 10/1932 | Nehls | .................... F16B 41/005 70/232 |
| 2,755,655 A | * | 7/1956 | Maffey | ................ B62D 53/085 280/433 |
| 4,031,722 A | | 6/1977 | Michelman et al. | |
| 4,254,647 A | | 3/1981 | Finck, Jr. | |
| 4,444,031 A | | 4/1984 | Watson | |
| 4,621,230 A | | 11/1986 | Crouch et al. | |
| 4,751,831 A | | 6/1988 | Morris, Jr. et al. | |
| 4,754,628 A | * | 7/1988 | Siegel | .................... F16B 41/005 70/230 |
| 5,078,437 A | | 1/1992 | Borgmeyer et al. | |

(Continued)

FOREIGN PATENT DOCUMENTS

| | | | | |
|---|---|---|---|---|
| EP | 2902573 A1 | * | 8/2015 | ............. E05B 67/36 |
| RU | 189674 U1 | | 5/2019 | |
| WO | 2009007916 A2 | | 1/2009 | |

*Primary Examiner* — Victor D Batson
*Assistant Examiner* — Jock Wong
(74) *Attorney, Agent, or Firm* — Mark Young, PA

(57) ABSTRACT

An anti-tampering device includes a housing with a bolt channel and a lock channel. The lock channel is aligned with, intersects and is perpendicular to the bolt channel. A head of a bolt and a portion of a shank of a bolt is received in the bolt channel. A lock received in the lock channel extends into the bolt channel, in proximity to the shank of the bolt, when the lock is in a locked position. The portion of the lock extending into the bolt channel prevents removal of the head of the bolt from the bolt channel.

20 Claims, 11 Drawing Sheets

(56) References Cited

U.S. PATENT DOCUMENTS

| | | | |
|---|---|---|---|
| 5,280,941 A * | 1/1994 | Guhlin | B60D 1/60 |
| | | | 411/910 |
| 5,469,722 A | 11/1995 | Ellefsen | |
| 5,904,383 A | 5/1999 | Van Der Wal | |
| 5,988,966 A | 11/1999 | Chen et al. | |
| 6,308,997 B1 | 10/2001 | Haseley et al. | |
| 6,684,548 B1 | 2/2004 | Petrus | |
| 6,820,362 B1 | 11/2004 | Petrus | |
| 7,172,381 B2 * | 2/2007 | Miyazaki | F16B 37/14 |
| | | | 411/429 |
| 9,803,794 B2 | 10/2017 | White | |
| 2002/0012577 A1 * | 1/2002 | Grant | E05B 73/0076 |
| | | | 411/87 |
| 2003/0019258 A1 * | 1/2003 | Irgens | E05B 73/0005 |
| | | | 70/231 |
| 2011/0027044 A1 | 2/2011 | Dillenberger | |
| 2015/0321624 A1 | 11/2015 | Parenti | |
| 2016/0176629 A1 | 6/2016 | Dang | |
| 2019/0360239 A1 | 11/2019 | Engibarov et al. | |

* cited by examiner

ANTI-TAMPERING DEVICE THAT ENVELOPES THE HEAD OF A FASTENER

FIELD OF THE INVENTION

This invention relates generally to anti-tampering devices that envelope a head of a fastener, and, more particularly, to a locking apparatus that envelopes, conceals and prevents access to the head of a bolt.

BACKGROUND

Various security and tamper-resistant bolts have been devised to reduce risk of disassembly of objects bolted together. Many of these bolts require special tools for installation. Some of these bolts cannot be removed without cutting. Often, the head of the bolt is exposed, which invites tampering.

Other tamper resistant devices include tubes for containing bolt heads or nuts and caps for covering the open end of the tubes. Yet other tamper resistant devices include bolt shanks with through-holes engaged by locks.

By way of example, U.S. Pat. No. 4,444,031 describes a security device for tackle boxes and the like. The device is a hollow cylinder with an open end and an opposite end with a screw hole. A screw extends through the screw hole and secures the cylinder to a wall or floor. A tool box, safe or tackle box has a hole in the bottom. The hole is sized and shaped to receive the cylinder. Aligned holes extend through the wall of the cylinder near the open end. A U-shaped shackle of a pad lock extends through the aligned holes. The shackle impedes access to the screw head contained in the cylinder.

As another example, U.S. Pat. No. 4,751,831 describes a lock for a meter housing. The lock includes a bolt threaded into an anchor (i.e., an angle bracket) inside the housing. The head of the bolt extends through the housing and through an opening in a latch on a door. A puck lock engages the head of the bolt. In the preferred embodiment, the head of the bolt is specially shaped (e.g., hourglass shaped) with a curvature that mates with (i.e., abuts) a portion of the periphery of a locking element in the puck lock. This lock relies upon the abutting interplay of the hourglass head and locking element to resist withdrawal. As the locking element and head are not aligned, slight skewing of the bolt would be enough to release the bolt.

As another example, U.S. Pat. No. 5,078,437 illustrates a pivoting handle in a locked position. A shackle of a padlock extends through a hole in the handle and through an adjacent hole in a cylinder bolted to a door. The shackle impedes access to the head of a bolt in the cylinder.

As another example, U.S. Pat. No. 6,684,548 describes a security device for a firearm. The device is a hollow cylinder with an open end and an opposite end with a screw hole. A screw extends through the screw hole and secures the cylinder to a wall or other surface. The cylinder is sized and shaped to extend through a trigger guard between the trigger and trigger guard. Aligned holes extend through the wall of the cylinder near the open end. A U-shaped shackle of a padlock extends through the aligned holes. The shackle prevents access to the screw head contained in the cylinder. The padlock prevents removal of the firearm from the cylinder.

An anti-tampering device that conceals and prevents access to the head of a conventional bolt or screw, or to another conventional engageable element on a bolt or screw, such as a nut, is needed. The device should be easy to use and capable of achieving good locking performance with conventional bolts, screws, and nuts.

The invention is directed to overcoming one or more of the problems and solving one or more of the needs as set forth above.

SUMMARY OF THE INVENTION

To solve one or more of the problems set forth above, in a non-limiting exemplary implementation of the invention, an anti-tampering device includes a housing with a front side and a back side. The back side is opposite the front side. A bolt channel extends into the housing from the back side of the housing. The bolt channel has a central longitudinal axis, an open end and a closed end. The open end of the bolt channel is at the back side of the housing. The closed end of the bolt channel is within the housing.

A lock channel extends into the housing. The lock channel has a central longitudinal axis. The central longitudinal axis of the lock channel is perpendicular to the central longitudinal axis of the bolt channel. The central longitudinal axis of the lock channel and the central longitudinal axis of the bolt channel are in planar alignment. Thus, the axes lie in an imaginary plane. The lock channel has an open end and a distal end. The inner end of the lock channel is opposite the open end of the lock channel and is within the housing. The inner end of the lock channel intersects the bolt channel between the open end of the bolt channel and the closed end of the bolt channel.

A lock is slidably received in the lock channel. For clarification, the lock may move linearly within the lock channel, in both directions (i.e., inwardly and outwardly), when movement is not restrained by a locking element. The lock includes an outer end and an inner end opposite the outer end. The lock is movable from a locked position to an unlocked position. In the locked position, the inner end of the lock extends through the inner end of the lock channel into the bolt channel. In the unlocked position the inner end of the lock does not extend through the inner end of the lock channel into the bolt channel.

The lock includes an outer sleeve with a locking aperture. The lock also includes a locking element that is movable between a retracted position and an extended position. In the extended position, the locking element extends through the locking aperture. In the retracted position, the locking element does not extend through the locking aperture.

The housing includes a cavity aligned with the locking aperture. The locking element extends through the locking aperture into the cavity when the locking element is in the extended position, in the locked position. By way of example, the locking element may comprise a sphere, a cylinder, a wedge, or an element having another shape. The cavity may be an annular compartment undercut in the locking channel, a section of such an annular compartment, or another channel that intersects the locking channel.

The lock includes a guide defining a range of linear motion of the lock. The range of linear motion is between a locked position and an unlocked position. The guide may be an elongated keyseat (e.g., an elongated recess or slot). A key may extend from the housing into the elongated keyseat. The keyseat has a longitudinal axis that is parallel to the central longitudinal axis of the lock channel. A set screw (i.e., key) has a shank threaded into the housing. A tip of the set screw extends from the shank into the keyseat, limiting linear movement of lock, but not preventing linear motion within the range of motion defined by the keyseat.

The housing includes a threaded channel in which the shank of the set screw is threadedly received. The threaded channel extends from the back side of the housing to the lock channel.

The bolt includes a shank and an engageable element on the shank. The engageable element and a portion of the shank are received in the bolt channel. The received engageable element is adjacent to (i.e., in proximity to or abutting) the closed end of the bolt channel. The engageable element is an object that is permanently or removably on the shank, fits within the bolt channel and is blocked from removal by the lock when the lock is in the locked position. By way of example, the engageable element may be a head of the bolt or a nut threaded on the shank of the bolt. The engageable element has a width or diameter that exceeds the width or diameter of the shank of the bolt. Where the engageable element meets the shank, the engageable element and shank are concentric.

A nut may also be threaded on the shank, with the back side of the nut adjacent to the open end of the bolt channel and adjacent to the back side of the housing. In this embodiment the nut is at or near the open end of the bolt channel while the engageable element is at or near the closed end of the bolt channel. When the lock is in the locked position and the engageable element is in the bolt channel at or near the closed end of the bolt channel, the lock prevents withdrawal of the engageable element. The nut at the back side of the housing prevents skewing the bolt relative to the housing.

A head of a bolt or an end of a bolt with a nut may extend from an object. By way of example and not limitation, the object may be an article of manufacture, an apparatus, or a machine. An anti-tampering device according to principles of the invention may contain and lock the bolt head or nut in the housing. The back side of the housing may be flush (or about flush) against the article of manufacture, apparatus, or machine, while the bolt head or nut is locked in the anti-tampering device.

The invention may be applied to any bolt that has sufficient length for fastening and for being engaged in an anti-tampering device according to principles of the invention. A user may readily determine the length of a bolt required for fastening, and the additional length required to engage an anti-tampering device according to principles of the invention.

BRIEF DESCRIPTION OF THE DRAWINGS

The foregoing and other aspects, objects, features and advantages of the invention will become better understood with reference to the following description, appended claims, and accompanying drawings, where:

Figure 1:
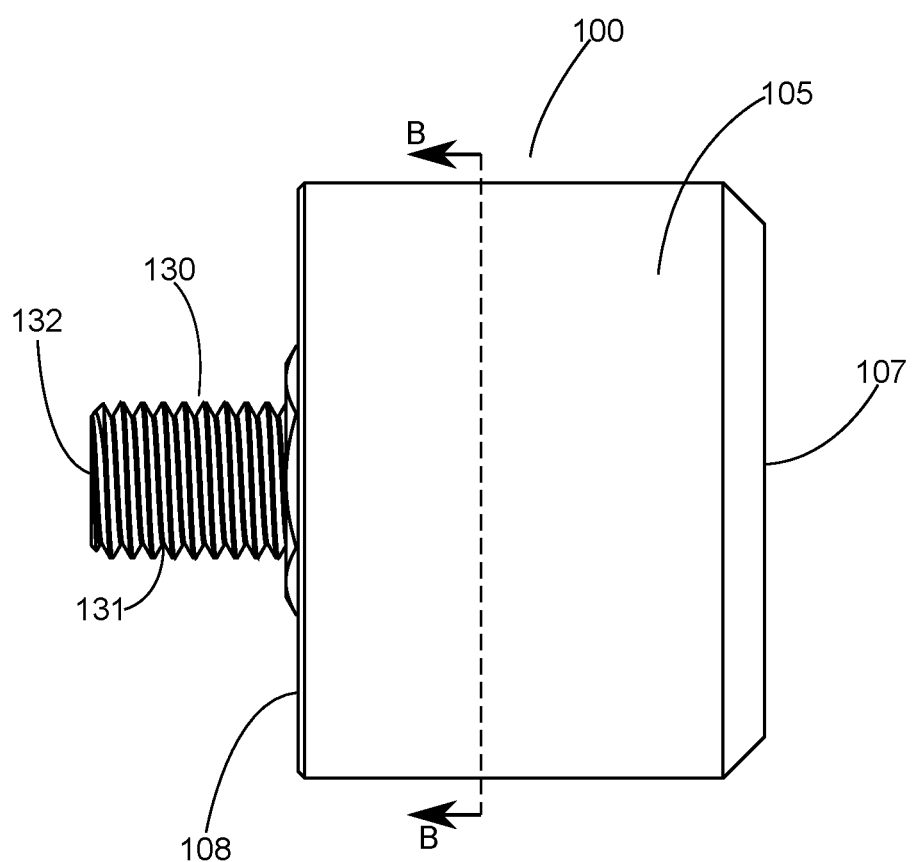
FIG. 1 is a profile view of an exemplary anti-tampering device according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

With reference to the drawings, an exemplary anti-tampering device 100 according to principles of the invention protects, from tampering, a head 140 of a bolt 130 and/or a nut threaded on a threaded shank 131 of a bolt 130. Tampering may entail unauthorized removal and disassembly. Protection is achieved by retaining the bolt head 140 or a nut in a housing 105. A lock 200 prevents withdrawal of the bolt head 140 or nut from the housing 105. The housing 105 does not impede rotation of the bolt 130, bolt head 140 or nut relative to the housing. Rotation of the housing 105 will not cause rotation of the bolt 130, bolt head 140 or nut.

For convenience of reference, the term bolt is used herein to broadly encompass any threaded fastener. Nonlimiting examples include conventional bolts, screws and threaded studs, regardless of whether the threaded fastener is used for assembly of two or more unthreaded components with the aid of a nut, or is used to attach an object to another object that includes a threaded opening for threaded mating with the threaded fastener.

With reference to FIGS. 1-3 and 7-9, the exemplary anti-tampering device 100 includes a housing 105 with a front side 107 and a back side 108. The back side 108 is opposite the front side 107. The front side 107 faces outwardly from a received portion of a bolt 130. In use, the back side 108 of the housing 105 abuts or is positioned immediately adjacent to an object from which the bolt 130 extends. This arrangement, relative to the object from which the bolt 130 extends, renders the back side 108 of the housing 105 substantially inaccessible, when the anti-tampering device 100 is locked to a bolt 130.

Figure 4:
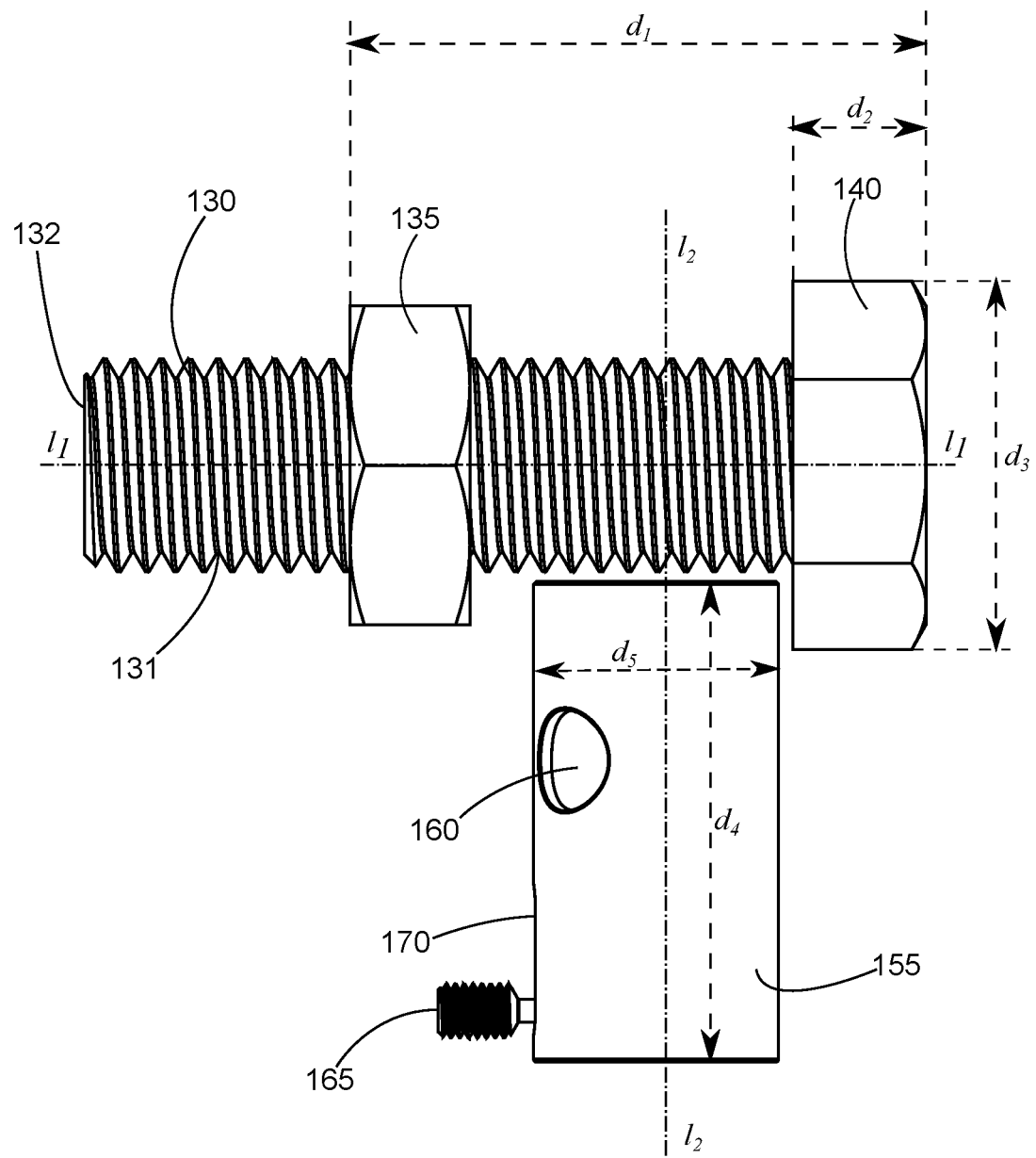
FIG. 4 is a profile view of an exemplary fastener and locking ferrule for an exemplary anti-tampering device according to principles of the invention.
Figure 7:
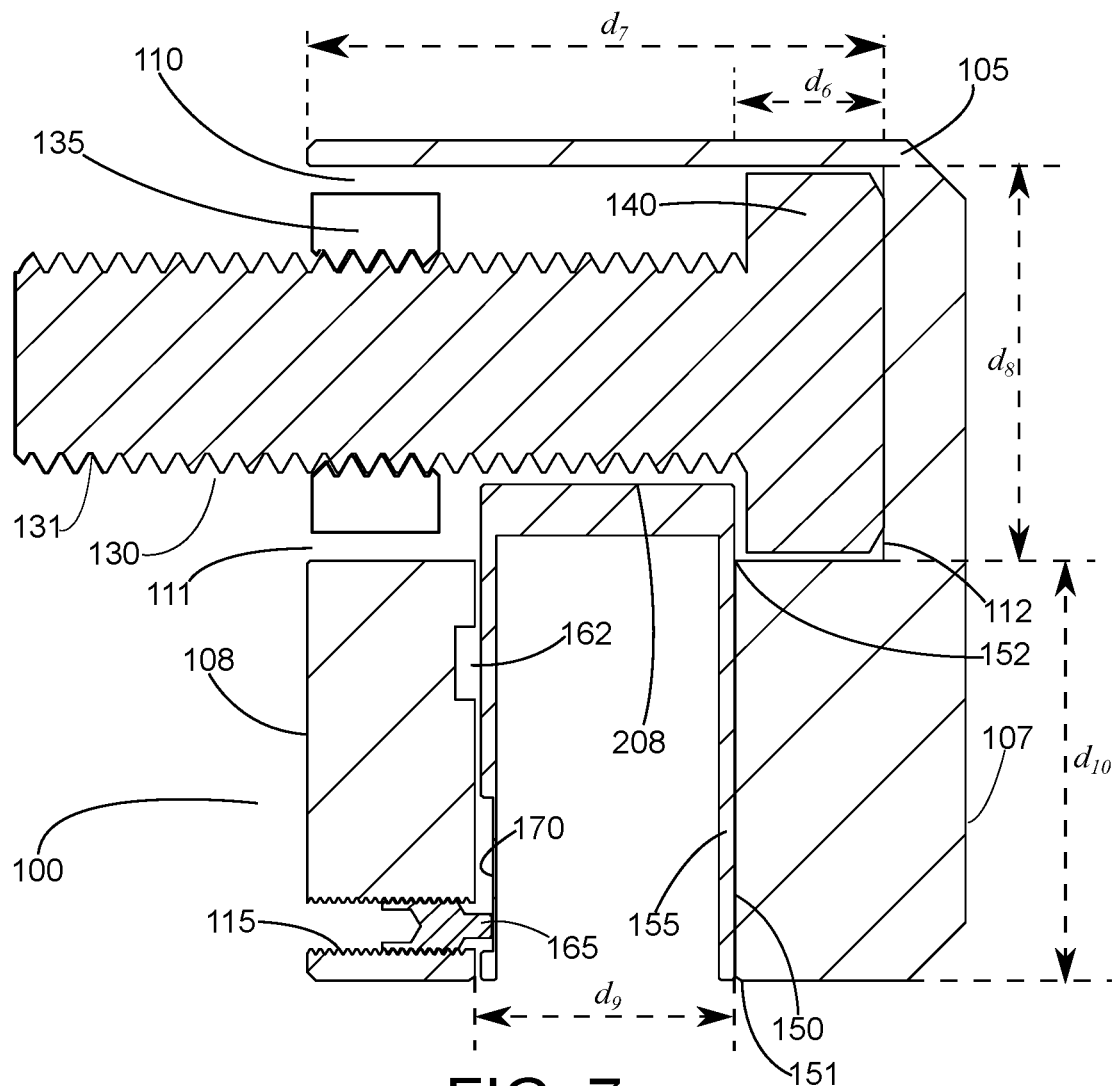
FIG. 7 is a section view (Sect. A-A) of an exemplary anti-tampering device according to principles of the invention.

A bolt channel 110 extends into the housing 105 from the back side 108 of the housing 105. The bolt channel 110 has a central longitudinal axis, $l_1$, as shown in FIG. 4, an open end 111 and a closed end 112. The exemplary bolt channel 110 has a length, $d_7$, and a circular cross section shape with a diameter, $d_8$. The open end 111 of the bolt channel 110 is at the back side 108 of the housing 105. The closed end 112 of the bolt channel 110 is within the housing 105. The closed end 112 of the bolt channel 110 is a distance, $d_6$, away from the intersection of the lock channel 150, described below. The distance, $d_6$, as shown in FIG. 7, is at least as great as the thickness, $d_2$, of the engageable element (e.g., head) 140 of the bolt 130, as shown in FIG. 4. The length of the bolt 130 exceeds the length, $d_7$, of the bolt channel 110. The diameter, $d_8$, of the bolt channel 110 is at least as great as the maximum width, $d_3$, of the engageable element (e.g., head) 140 of the bolt 130, as shown in FIG. 4. The distance, $d_1$, as shown in FIG. 4, from the end of the engageable element (e.g., head) 140 of the bolt 130 to the outer end of the jam nut 135 is about equal (±10%) to the length of the bolt channel 110, $d_7$. A bolt channel 110 with these dimensions receives the engageable element (e.g., head) 140 of the bolt 130, and a portion of the shank 131 of the bolt 130. A housing 105 with a bolt channel 110 with these dimensions does not cause rotation of the engageable element (e.g., head) 140 of the bolt 130 when the housing 105 is rotated.

Figure 3:
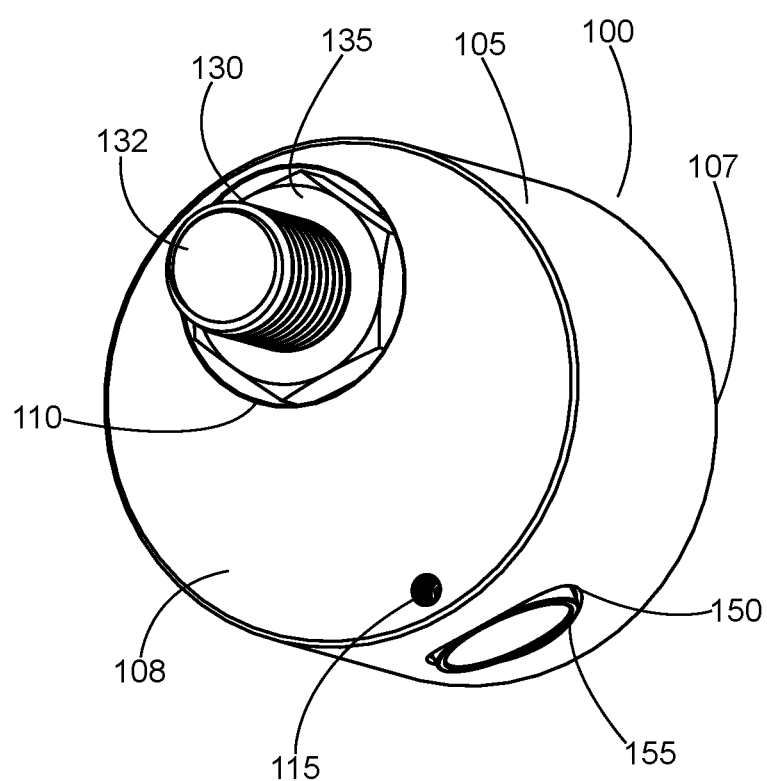
FIG. 3 is a second perspective view of an exemplary anti-tampering device according to principles of the invention.
Figure 8:
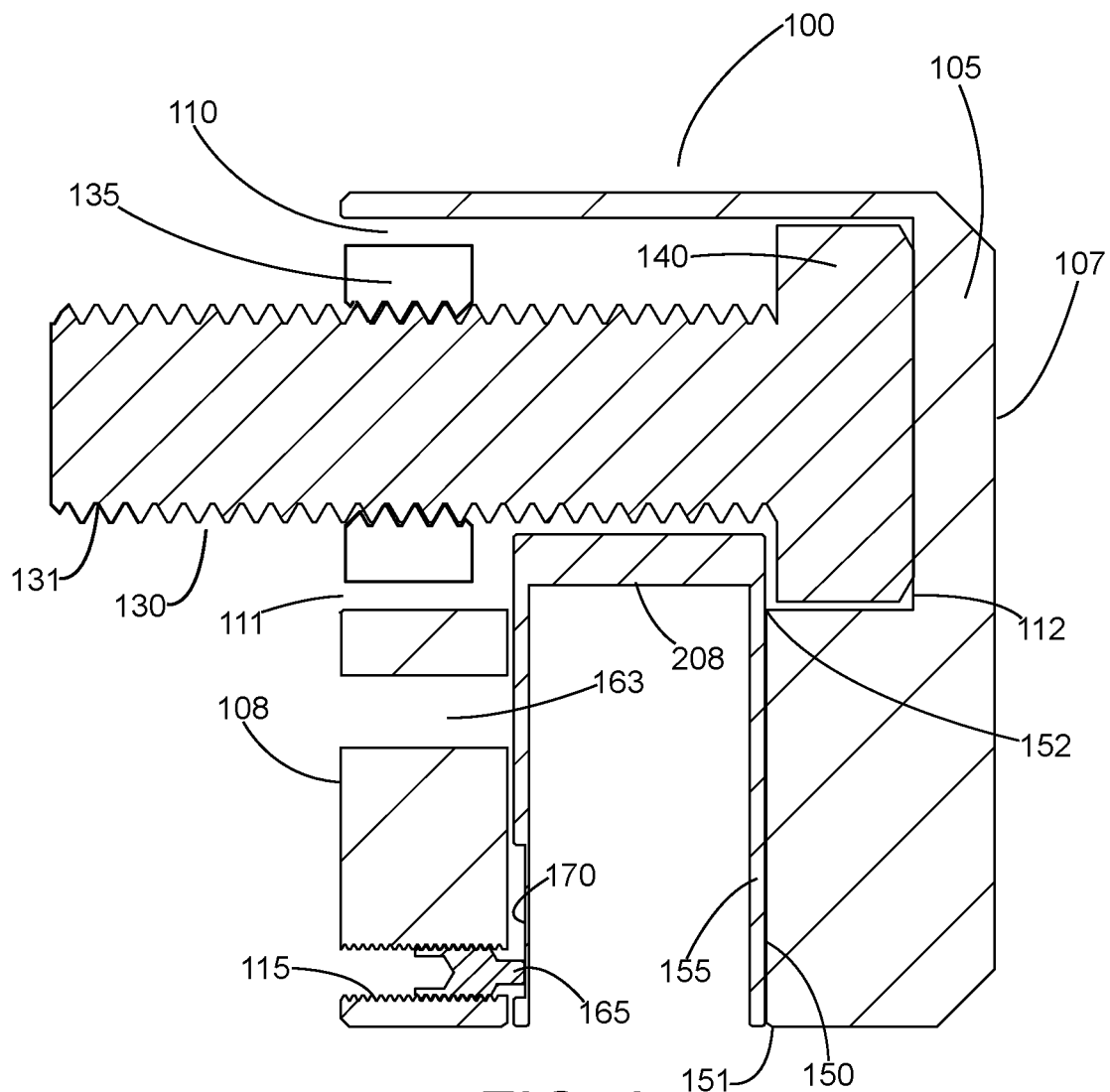
FIG. 8 is a section view of an alternative exemplary embodiment of an anti-tampering device according to principles of the invention.

As shown in FIGS. 3, 7 and 8, a lock channel 150 extends into the housing 105. The lock channel 150 has a central longitudinal axis, $l_2$, as shown in FIG. 4. The central longitudinal axis, $l_2$, of the lock channel 150 is perpendicular to the central longitudinal axis, $l_1$, of the bolt channel 110. The central longitudinal axis, $l_2$, of the lock channel 150 and the central longitudinal axis, $l_1$, of the bolt channel 110 are in planar alignment. Thus, both axes, $l_1$ and $l_2$, lie in an imaginary plane. The lock channel 150 has an open end 151 and an inner end 152. The inner end 152 of the lock channel 150 is opposite the open end 151 of the lock channel 150 and is within the housing 105. The inner end 152 of the lock channel 150 intersects the bolt channel 110 between the open end 111 of the bolt channel 110 and the closed end 112 of the bolt channel 110. The closed end 112 of the bolt channel 110 is a distance, $d_6$, away from the intersection of the lock channel 150.

In the exemplary embodiment, the lock channel 150 has a circular cross-section shape, with a diameter, $d_9$. The diameter, $d_9$, is at least as great as the diameter, $d_5$, of the tubular cylindrical outer sleeve 155 of the lock 200, as shown in FIGS. 4-9. In the exemplary embodiment, the length, $d_4$, of the outer sleeve 155 of the lock 200 is greater than the length, $d_{10}$, of the lock channel 150, measured from the open end to the intersection. The difference between the length, $d_4$, of the outer sleeve 155 of the lock 200 and the length, $d_{10}$, of the lock channel 150, is the distance by which the outer sleeve 155 of the lock 200 extends into the bolt channel 110. This difference is less than the distance between the shank 131 of the bolt 130 and the intersection at the inner end 152 of the lock channel 150. Thus, the end 208 of the outer sleeve 155 of the lock 200 is in proximity to, but does not reach the shank 131 of the bolt 130, when the lock 200 is fully inserted in the lock channel 150. Concomitantly, the end 208 of the outer sleeve 155 of the lock 200, which protrudes into the space between the shank 131 and the intersection at the inner end 152 of the lock channel 150, prevents withdrawal of the engageable element (e.g., head) 140 of the bolt 130 in the bolt channel 110.

In the illustrated exemplary embodiment, the diameter, $d_9$, is about the same, only slightly greater than the diameter, $d_5$, of the tubular cylindrical outer sleeve 155 of the lock 200, as shown in FIGS. 4-9. The distance, $d_6$, as shown in FIG. 7, is at least as great as, but only slightly greater than, the thickness, $d_2$, of the engageable element (e.g., head) 140 of the bolt 130, as shown in FIG. 4. In this configuration, the outer sleeve 155 of the lock 200 restrains the engageable element (e.g., head) 140 of the bolt 130 from any appreciable linear movement in the bolt channel 110. A portion of the engageable element (e.g., head) 140 of the bolt 130 is sandwiched (i.e., disposed) between the end 208 of the outer sleeve 155 of the lock 200, and the closed end 112 of the bolt channel 110. The engageable element (e.g., head) 140 of the bolt 130 may be removed from the lock channel 110, only when the end 208 of the outer sleeve 155 of the lock 200 is withdrawn to at least the intersecting end 152, towards the open end 151 of the lock channel 150.

The lock 200 is a locking assembly that is slidably received in the lock channel 150. For clarification, the lock 200 may move linearly within the lock channel 150, in both directions (i.e., inwardly and outwardly), when movement is not restrained by a locking element 210. The lock 200 includes an outer end 205 and an inner end 208 opposite the outer end 205. The lock 200 is movable from a locked position to an unlocked position. In the locked position, the inner end 208 of the lock extends through the inner end 152 of the lock channel 150 into the bolt channel 110. In the unlocked position, the inner end 208 of the lock 200 does not extend through the inner end 152 of the lock channel 150 into the bolt channel 110.

The lock 200 includes an outer sleeve 155 with a locking aperture 160. The lock 200 also includes a locking element 210 that is movable between a retracted position and an extended position. In the extended position, the locking element 210 extends through the locking aperture 160. In the retracted position, the locking element 210 does not extend through the locking aperture 160.

The housing 105 includes a channel or cavity 162 aligned with the locking aperture 160. The locking element 210 extends through the locking aperture 160 into the cavity 162 when the locking element 210 is in the extended position. While a cylindrical locking element is depicted, the locking element 210 may comprise elements having other shapes. In one embodiment, the locking element 210 is spring biased within the lock 200 into an extended position and retracted by unlocking the lock 200. In another embodiment, the locking element 210 may be spring biased within the lock 200 into a retracted position and extended by locking the lock 200. In yet another embodiment, the locking element 210 is moved between an extended position and a retracted position by one or more linkages within the lock 200 that are actuated upon locking and unlocking.

The lock 200 includes a guide 170 defining a range of linear motion of the lock. The range of linear motion is between a locked position and an unlocked position. In the illustrated embodiment, the guide 170 is an elongated keyseat (e.g., an elongated recess or slot). A key 165 may extend from the housing 105 into the elongated keyseat comprising the guide 170. keyseat has a longitudinal axis, $l_3$, that is parallel to the central longitudinal axis, $l_2$, of the lock. In the exemplary embodiment, the key 165 is a set screw. The set screw has a shank threaded into a threaded channel 115 of the housing 105. The housing 105 includes a threaded channel 115 in which the shank of the set screw is threadedly received. The threaded channel 115 extends from the back side 108 of the housing 105 to the lock channel 150. A tip of the set screw extends from the shank into the keyseat 170, limiting linear movement of lock 200, but not preventing linear motion within the range of motion defined by the keyseat 170.

The bolt 130 includes a shank 131 and an engageable element 140 on the shank. The engageable element 140 and a portion of the shank 131 are received in the bolt channel 110. The received engageable element 140 is adjacent to (i.e., in proximity to or abutting) the closed end 112 of the bolt channel 110. The engageable element 140 is an object that is permanently or removably on the shank 131, fits within the bolt channel 110 and is blocked from removal by the lock 200 when the lock 200 is in the locked position. By way of example, the engageable element 140 may be a head of the bolt 130, or a nut threaded on the end of the shank of a stud. Such a head or nut is typically hexagonal in cross section shape, and has a maximum width that is not greater than the diameter, $d_8$, of the bolt channel 110. Such width of the engageable element 140 exceeds the diameter of the shank 131 of the bolt 130. Where the engageable element 140 meets the shank 131, the engageable element 140 and shank 131 are concentric.

In the illustrated exemplary embodiment, the entire shank 131 is threaded. However, the invention is not limited to such a fastener. Fasteners with shanks having threads extending only partially along the shank, such as from the free end of the shank to a point between the free end and the engageable element (e.g., head) of the shank, may be used within the scope of the invention.

A nut 135 (e.g., a jam nut) may also be threaded on the shank 131, with the back side of the nut adjacent to the open end 111 of the bolt channel 110 and adjacent to the back side 108 of the housing 105. In this embodiment the nut 135 is at or near the open end 111 of the bolt channel 110 while the engageable element 140 is at or near the closed end 112 of the bolt channel 110. When the lock 200 is in the locked position and the engageable element 140 is in the bolt channel 110 at or near the closed end 112 of the bolt channel 110, the lock 200 prevents withdrawal of the engageable element 140.

A bolt 130 may extend from an assembled object. By way of example and not limitation, the object may be an article of manufacture, an apparatus, or a machine. An anti-tampering device 100 according to principles of the invention may contain and lock the bolt head or nut in the housing 105. The back side 108 of the housing 105 may be flush (or about flush) against the article of manufacture, apparatus, or machine, while the bolt head or nut is locked in the anti-tampering device 100. In this configuration, the device 100 prevents access to the head of the bolt 130 and prevents removal of the bolt 130.

Referring to FIG. 1, a profile view of an exemplary anti-tampering device 100 according to principles of the invention is provided. The housing 105, including the front 107 and back 108 sides, are shown. A portion of the shank 132 of a bolt 130 extends from the open end 111 of the bolt channel 110. The section line B-B corresponds to the section view of FIG. 12.

Figure 2:
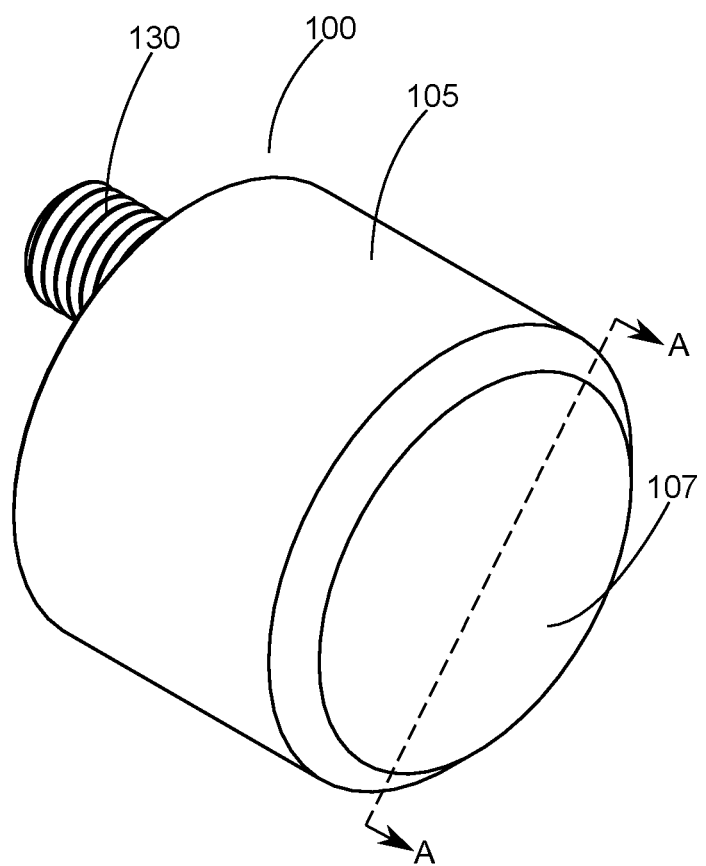
FIG. 2 is a first perspective view of an exemplary anti-tampering device according to principles of the invention.

FIG. 2 provides a first perspective view of the exemplary anti-tampering device 100. The housing 105, including the front 107 side, is shown. A portion of the shank 132 of a bolt 130 extends from the open end 111 of the bolt channel 110 at the back side 108 of the housing. The section line A-A corresponds to the section view of FIG. 7.

FIG. 3 provides a second perspective view of the exemplary anti-tampering device 100. The housing 105, including the front 107 and back 108 sides, are shown. A portion of the shank 132 of a bolt 130 extends from the open end 111 of the bolt channel 110 at the back side 108 of the housing 105. A threaded channel 115 is provided for a set screw that serves as a key 165. The threaded channel 115 extends from the back side 108 of the housing 105 to the lock channel 150. A portion of the shank 132 of the bolt 130 may be threaded into another object. A jam nut 135 is shown in the bolt channel 110 at the back side 108 of the housing 105. The lock channel 150 with the outer sleeve 155 of the lock 200 inserted into the lock channel 150 are also visible in FIG. 3.

FIG. 4 illustrates the locking mechanism with a profile view of an exemplary fastener and locking ferrule (i.e., outer sleeve 155 of lock 200) for an exemplary anti-tampering device 100. The longitudinal axis, $l_1$, of the bolt channel 110 is shown. This imaginary axis extends longitudinally through the center of the bolt channel 110. Likewise, the longitudinal axis, $l_2$, of the lock channel 150 is shown. This imaginary axis extends longitudinally through the center of the lock channel 150. The longitudinal axis, $l_1$, of the bolt channel 110 is perpendicular to the longitudinal axis, $l_2$, of the lock channel 150. Additionally, the longitudinal axis, $l_1$, of the bolt channel 110 is in planar alignment with the longitudinal axis, $l_2$, of the lock channel 150. Thus, the longitudinal axis, $l_1$, of the bolt channel 110 and the perpendicular longitudinal axis, $l_2$, of the lock channel 150 lie in an imaginary plane. The end 208 of the outer sleeve 155 is positioned in the bolt channel 110 adjacent to the shank 131 of the bolt 130, without contacting the shank 131. The perpendicular arrangement and planar alignment ensure positive locking. The outer sleeve 155 of the lock 200 provides a barrier to removal of the head 140 of the bolt 130.

The exemplary bolt channel 110 has a length, $d_7$, and a circular cross section shape with a diameter, $d_8$. The closed end 112 of the bolt channel 110 is a distance, $d_6$, away from the intersection of the lock channel 150. The distance, $d_6$, as shown in FIG. 7, is at least as great as the thickness, $d_2$, of the engageable element (e.g., head) 140 of the bolt 130, as shown in FIG. 4. The length of the bolt 130 exceeds the length, $d_7$, of the bolt channel 110. The diameter, $d_8$, of the bolt channel 110 is at least as great as the maximum width, $d_3$, of the engageable element (e.g., head) 140 of the bolt 130, as shown in FIG. 4. The distance, $d_1$, as shown in FIG. 4, from the end of the engageable element (e.g., head) 140 of the bolt 130 to the outer end of the jam nut 135 is about equal (±10%) to the length of the bolt channel 110, $d_7$.

Figure 5:
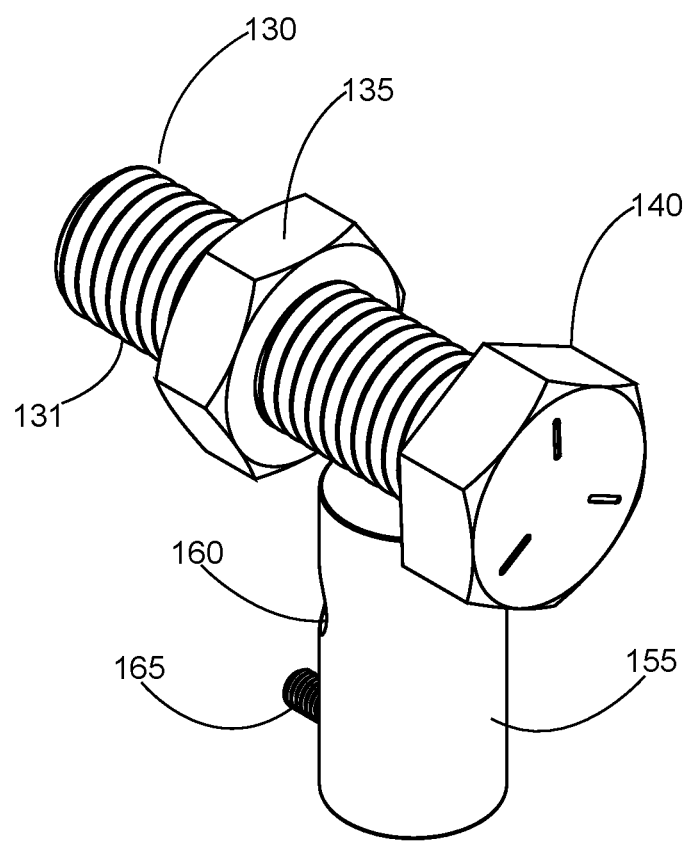
FIG. 5 is a first perspective view of an exemplary fastener and locking ferrule for an exemplary anti-tampering device according to principles of the invention.
Figure 6:
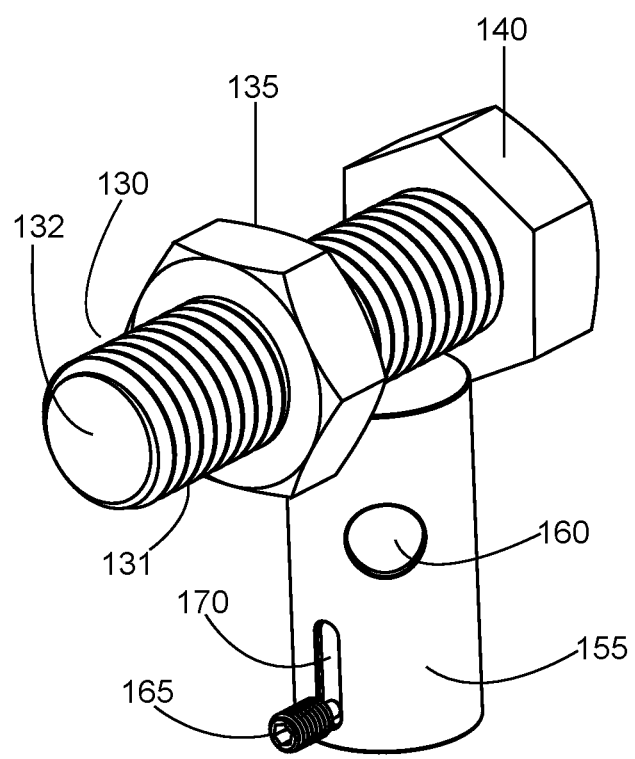
FIG. 6 is a second perspective view of an exemplary fastener and locking ferrule for an exemplary anti-tampering device according to principles of the invention.
Figure 10:
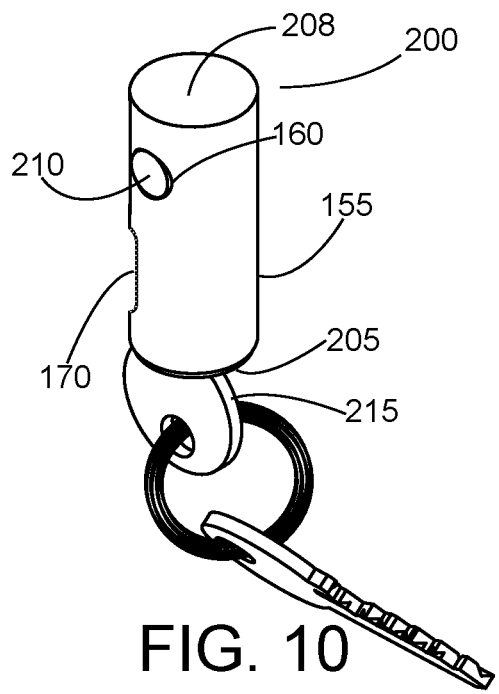
FIG. 10 is a first perspective view of an exemplary lock assembly in an unlocked configuration for an exemplary anti-tampering device according to principles of the invention.
Figure 11:
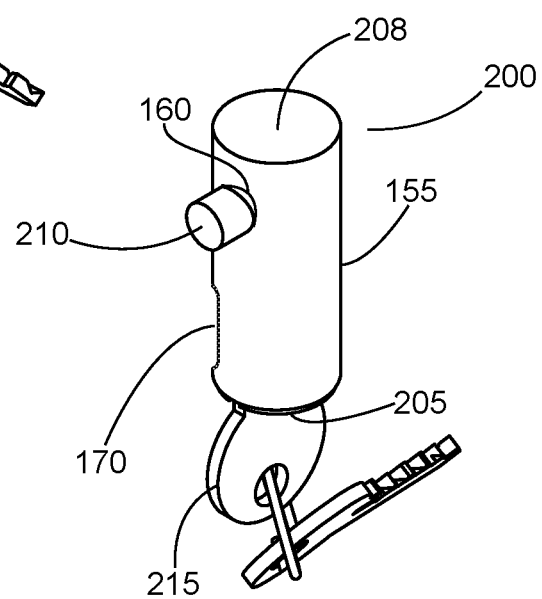
FIG. 11 is a second perspective view of an exemplary lock assembly in a locked configuration for an exemplary anti-tampering device according to principles of the invention.

FIGS. 5 and 6 provide perspective views of an exemplary fastener and locking ferrule, i.e., outer sleeve 155 of the lock 200, for the exemplary anti-tampering device 100 according to principles of the invention. When fully assembled, the outer sleeve 155 contains a locking mechanism and constitutes part of the lock assembly 200, an exemplary embodiment of which is illustrated in FIGS. 10 and 11. The exemplary lock (i.e., lock assembly) 200 includes outer sleeve 155 with locking aperture 160. The sleeve is a hollow cylindrical tubular structure with a closed upper end 208 and an opened end opposite the upper end 208. A lock mechanism is received in the opened end. The lock mechanism includes a locking element 210. The locking element 210 is movable between a retracted position and an extended position. In the extended position, the locking element 210 extends through the locking aperture 160. In the retracted position, the locking element 210 does not extend through the locking aperture 160. The locking element 210 extends through the locking aperture 160 into the cavity 162 in the housing 105 when the locking element 210 is in the extended position. While a cylindrical locking element 210 is depicted, the locking element 210 may comprise elements having other shapes. The invention is not limited to any particular shape of locking element 210, sleeve 155, locking aperture 160 or corresponding cavity 162. Shapes other than those illustrated may be implemented within the scope of the invention.

Also apparent in FIGS. 5 and 6, the sleeve 155 includes a guide 170 defining a range of linear motion of the lock 200.

The range of linear motion is between a locked position and an unlocked position. In the illustrated embodiment, the guide 170 is an elongated keyseat (e.g., an elongated recess or slot). A key 165 may extend from the housing 105 into the elongated keyseat comprising the guide 170. keyseat has a longitudinal axis, $l_3$, that is parallel to the central longitudinal axis, $l_2$, of the lock. In the exemplary embodiment, the key 165 is a set screw. The set screw has a shank threaded into a threaded channel 115 of the housing 105. The housing 105 includes a threaded channel 115 in which the shank of the set screw is threadedly received. The threaded channel 115 extends from the back side 108 of the housing 105 to the lock channel 150. A tip of the set screw extends from the shank into the keyseat 170, limiting linear movement of lock 200, but not preventing linear motion within the range of motion defined by the keyseat 170.

In FIGS. 5 and 6, the sleeve 155 is shown in the locked position. In the locked position, the upper end 208 of the sleeve 155 is in proximity to, without contacting, the shank 131 of the bolt 130. The end 208 of the sleeve 155 is disposed between nut 135 and bolt head 140. In the locked position, the end 208 of the sleeve 155 blocks withdrawal of the head 140 of the bolt 130 from the bolt channel 110. In the unlocked position, the end 208 of the sleeve 155 is away from the shank 131 of the bolt 130 a sufficient distance, so as to not block withdrawal of the head 140 of the bolt 130 from the bolt channel 110. The outer sleeve 155 of the lock 200 thus provides a barrier to removal of the head 140 of the bolt 130, when the lock 200 is in a locked position, and not when the lock 200 is in an unlocked position.

FIG. 7 provides a section view (Sect. A-A) of the exemplary anti-tampering device 100 with the sleeve 155 in a locked position, according to principles of the invention. The exemplary bolt channel 110, which extends into the housing 105 from the back side 108 of the housing 105, has a length, $d_7$, and a circular cross section shape with a diameter, $d_8$. The open end 111 of the bolt channel 110 is at the back side 108 of the housing 105. The closed end 112 of the bolt channel 110 is within the housing 105, a distance, $d_6$, away from the intersection of the lock channel 150. The distance, $d_6$, as shown in FIG. 7, is at least as great as the thickness, $d_2$, of the engageable element (e.g., head) 140 of the bolt 130. The length of the bolt 130 exceeds the length, $d_7$, of the bolt channel 110. The diameter, $d_8$, of the bolt channel 110 is at least as great as the maximum width, $d_3$, of the engageable element (e.g., head) 140 of the bolt 130, as shown in FIG. 4. The distance, $d_1$, as shown in FIG. 4, from the end of the engageable element (e.g., head) 140 of the bolt 130 to the outer end of the jam nut 135 is about equal (±10%) to the length of the bolt channel 110, $d_7$. The bolt channel 110 with these dimensions receives the engageable element (e.g., head) 140 of the bolt 130, and a portion of the shank 131 of the bolt 130. The housing 105 with a bolt channel 110 with these dimensions does not cause rotation of the engageable element (e.g., head) 140 of the bolt 130 when the housing 105 is rotated.

The lock channel 150 extends into the housing 105. The central longitudinal axis, $l_2$, of the lock channel 150 and the central longitudinal axis, $l_1$, of the bolt channel 110 are in planar alignment. The lock channel 150 has an open end 151 and an inner end 152, which is opposite the open end 151 of the lock channel 150, is within the housing 105 and intersects the bolt channel 110 between the open end 111 of the bolt channel 110 and the closed end 112 of the bolt channel 110.

In the exemplary embodiment, the lock channel 150 has a circular cross-section shape, with a diameter, $d_9$, that is at least as great as the diameter, $d_5$, of the tubular cylindrical outer sleeve 155 of the lock 200. In the exemplary embodiment, the length, $d_4$, of the outer sleeve 155 of the lock 200 is greater than the length, $d_{10}$, of the lock channel 150, measured from the open end 151 to the intersection. The difference between the length, $d_4$, of the outer sleeve 155 of the lock 200 and the length, $d_{10}$, of the lock channel 150, is the distance by which the outer sleeve 155 of the lock 200 extends into the bolt channel 110. This difference is less than the distance between the shank 131 of the bolt 130 and the intersection at the inner end 152 of the lock channel 150. Thus, the end 208 of the outer sleeve 155 of the lock 200 is in proximity to, but does not reach the shank 131 of the bolt 130, when the lock 200 is fully inserted in the lock channel 150. The end 208 of the outer sleeve 155 of the lock 200, which protrudes into the space between the shank 131 and the intersection at the inner end 152 of the lock channel 150, prevents withdrawal of the engageable element (e.g., head) 140 of the bolt 130 in the bolt channel 110.

The housing 105 includes a channel or cavity 162 aligned with the locking aperture 160. The locking element 210 extends through the locking aperture 160 in the sleeve 155 into the cavity 162 when the locking element 210 is in the extended position. The cavity 162 may be an annular cavity undercut or otherwise formed in the lock channel 150 during manufacturing. The annular cavity may extend for 360° (i.e., entirely around the lock channel 150), or for less than 360°, such as 180° (i.e., half way around the lock channel 150) or 90° (¼ way around the lock channel 150). In the illustrated embodiment, the cavity extends for less than 360°, and thus does not form a complete annulus or ring around the lock channel 150. The cavity 162 receives the locking element 210 when the locking element 210 is in an extended position, and the lock 200 is in the locked position.

Figure 12:
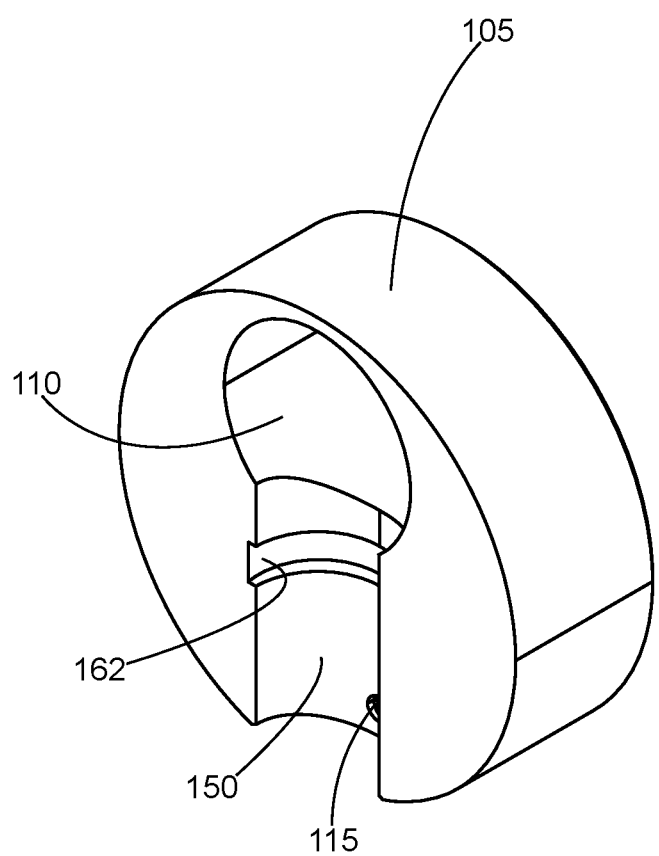
FIG. 12 is a perspective section view (section B-B) of an exemplary anti-tampering device according to principles of the invention.

FIG. 12 is a perspective section view (section B-B) of an exemplary anti-tampering device 100 according to principles of the invention. In this view, the cavity 162 is apparent. The cavity 162 is below the intersection of the lock channel 150 and the bolt channel 110, and above the threaded channel 115 for the key (set screw) 165.

FIG. 8 is substantially similar to FIG. 7, except that the embodiment of FIG. 8 omits the annular cavity 162. Instead, the embodiment of FIG. 8 includes a cylindrical cavity 163 bored from the back side 108 of the housing 105 to the lock channel 150, at a point at which the locking element 210 may be received when the locking element is in an extended position, and the lock 200 is in the locked position.

Figure 9:
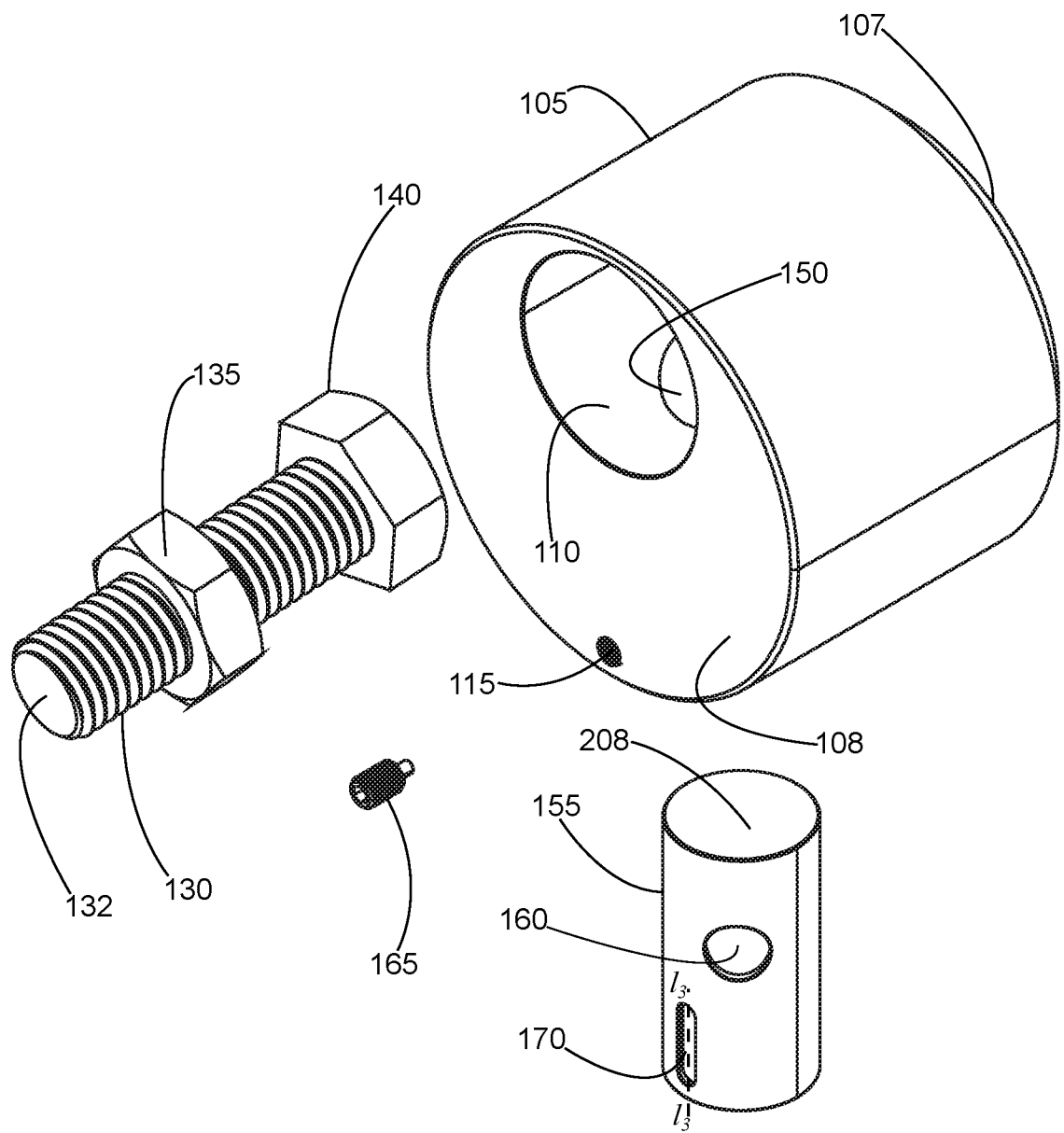
FIG. 9 is an exploded view of an exemplary anti-tampering device according to principles of the invention.

The exploded perspective view of FIG. 9 shows the bolt 130 and jam nut 135 removed from the bolt channel 110. The key (set screw) 165 is removed from the threaded channel 115. The outer sleeve 155 is removed from the lock channel 150. The outer sleeve 155 can be removed from the lock channel 150 when the key (set screw) 165 is backed off from the keyseat (guide) 170. Backing off and removal of the key 165 requires access to the back side 108 of the housing 105.

FIGS. 10 and 11 provide perspective views of the exemplary lock assembly 200 in unlocked and locked configurations. In the locked configuration, the locking element 210 is in an extended position, extending through the aperture 160 of the sleeve 155. In the unlocked configuration, the locking element 210 is in a retracted position and does not extend through the aperture 160 of the sleeve 155. The lock 200 includes an outer end 205 and an inner end 208 opposite the outer end 205. Locking and unlocking are achieved in a conventional manner by inserting a lock key 215 in a slot in the outer end 205 of the lock 200 and turning the lock key 215 clockwise or counterclockwise.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An anti-tampering device, the anti-tampering device comprising
   a housing with a front side and a back side, the back side being opposite the front side, and the housing including a cavity, the cavity comprising an annular cavity;
   a bolt channel extending into the housing from the back side of the housing, the bolt channel having a central longitudinal axis, an open end and a closed end, the open end of the bolt channel being at the back side of the housing, and the closed end of the bolt channel being within the housing; and
   a lock channel extending into the housing, the lock channel having a central longitudinal axis, the central longitudinal axis of the lock channel being perpendicular to the central longitudinal axis of the bolt channel, the central longitudinal axis of the lock channel and the central longitudinal axis of the bolt channel being in planar alignment, the lock channel having an open end and a distal end, an inner end of the lock channel being opposite the open end of the lock channel, the inner end of the lock channel being within the housing, the inner end of the lock channel intersecting the bolt channel between the open end of the bolt channel and the closed end of the bolt channel, the annular cavity extending at least 90° around the lock channel;
   a lock slidably received in the lock channel, the lock including an outer end and an inner end opposite the outer end, and the lock being movable from a locked position to an unlocked position, and in the locked position the inner end of the lock extending through the inner end of the lock channel into the bolt channel, and in the unlocked position the inner end of the lock not extending through the inner end of the lock channel into the bolt channel, the lock further including an outer sleeve with a locking aperture, a locking element movable between a retracted position and an extended position, and in the extended position, the locking element extending through the locking aperture, and, in the retracted position, the locking element not extending through the locking aperture, the locking aperture being aligned with the cavity.

2. The anti-tampering device of claim 1, the locking element extending through the locking aperture into the cavity when the locking element is in the extended position.

3. The anti-tampering device of claim 1, the lock including a guide defining a range of linear motion of the lock, the range of linear motion being between a locked position and an unlocked position.

4. The anti-tampering device of claim 3, the guide comprising an elongated keyseat.

5. The anti-tampering device of claim 4, the guide further comprising a key extending from the housing into the elongated keyseat.

6. The anti-tampering device of claim 5, the elongated keyseat having a longitudinal axis, the longitudinal axis of the elongated keyseat being parallel to the central longitudinal axis of the lock channel.

7. The anti-tampering device of claim 5, the key comprising a set screw, the set screw having a shank threaded into the housing and a tip extending from the shank into the elongated keyseat.

8. The anti-tampering device of claim 7, the housing including a threaded channel in which the shank of the set screw is threadedly received, the threaded channel extending from the back side of the housing to the lock channel.

9. The anti-tampering device of claim 1, further comprising a bolt, the bolt including a shank and an engageable element on the shank, and the engageable element and a portion of the shank being received in the bolt channel, the engageable element being adjacent to the closed end of the bolt channel.

10. The anti-tampering device of claim 9, the engageable element comprising a head of the bolt.

11. The anti-tampering device of claim 9, the engageable element comprising a nut threaded on the shank of the bolt.

12. The anti-tampering device of claim 9, further comprising a nut, the nut including a back side and a front side opposite the back side, and the nut being threaded on the shank of the bolt, and the back side of the nut being adjacent to the back side of the housing and the front side of the nut being between the back side of the housing and the closed end of the bolt channel.

13. The anti-tampering device of claim 12, the engageable element comprising a head of the bolt.

14. The anti-tampering device of claim 12, the engageable element comprising a second nut threaded on the shank of the bolt.

15. A bolt and nut anti-tampering device, the bolt and nut anti-tampering device comprising
   a housing with a front side and a back side, the back side being opposite the front side, and the housing including a cavity;
   a bolt channel extending into the housing from the back side of the housing, the bolt channel having a central longitudinal axis, an open end and a closed end, the open end of the bolt channel being at the back side of the housing, and the closed end of the bolt channel being within the housing; and
   a lock channel extending into the housing, the lock channel having a diameter and a central longitudinal axis, the central longitudinal axis of the lock channel being perpendicular to the central longitudinal axis of the bolt channel, the central longitudinal axis of the lock channel and the central longitudinal axis of the bolt channel being in planar alignment, the lock channel having an open end and a distal end, an inner end of the lock channel being opposite the open end of the lock channel, the inner end of the lock channel being within the housing, the inner end of the lock channel intersecting the bolt channel between the open end of the bolt channel and the closed end of the bolt channel;

a lock slidably received in the lock channel, the lock including an outer end and an inner end opposite the outer end, and the lock being movable from a locked position to an unlocked position, and in the locked position the inner end of the lock extending through the inner end of the lock channel into the bolt channel, and in the unlocked position the inner end of the lock not extending through the inner end of the lock channel into the bolt channel;

a bolt, the bolt including a shank and a head; and a nut threaded on the shank, and the head, a portion of the shank and nut being received in the bolt channel, and a distance between the nut and head being at least the diameter of the lock channel.

16. The bolt and nut anti-tampering device according to claim 15, wherein the cavity comprises an annular cavity, the annular cavity extending at least 90° around the lock channel, and the lock further includes an outer sleeve with a locking aperture, a locking element movable between a retracted position and an extended position, and in the extended position, the locking element extending through the locking aperture, and, in the retracted position, the locking element not extending through the locking aperture, the locking aperture being aligned with the cavity.

17. The bolt and nut anti-tampering device according to claim 16, wherein the nut includes a back side and a front side opposite the back side, and the back side of the nut being adjacent to the back side of the housing and the front side of the nut being between the back side of the housing and the closed end of the bolt channel.

18. A bolt anti-tampering device, the bolt anti-tampering device comprising:

a housing with a front side and a back side, the back side being opposite the front side, and the housing including an annular cavity;

a bolt channel extending into the housing from the back side of the housing, the bolt channel having a central longitudinal axis, an open end and a closed end, the open end of the bolt channel being at the back side of the housing, and the closed end of the bolt channel being within the housing; and a lock channel extending into the housing, the lock channel having a central longitudinal axis, the central longitudinal axis of the lock channel being perpendicular to the central longitudinal axis of the bolt channel, the central longitudinal axis of the lock channel and the central longitudinal axis of the bolt channel being in planar alignment, the lock channel having an open end and a distal end, an inner end of the lock channel being opposite the open end of the lock channel, the inner end of the lock channel being within the housing, the inner end of the lock channel intersecting the bolt channel at an intersection between the open end of the bolt channel and the closed end of the bolt channel, the annular cavity extending at least 90° around the lock channel;

a lock slidably received in the lock channel, the lock including an outer end and an inner end opposite the outer end, and the lock being movable from a locked position to an unlocked position, and in the locked position the inner end of the lock extending through the inner end of the lock channel into the bolt channel, and in the unlocked position the inner end of the lock not extending through the inner end of the lock channel into the bolt channel; and a bolt, the bolt including a threaded shank and an engageable element, and the engageable element and a portion of the threaded shank being received in the bolt channel, the engageable element being located between the closed end of the bolt channel and the intersection.

19. The bolt anti-tampering device of claim 18, the engageable element comprising a head of the bolt.

20. The bolt anti-tampering device of claim 18, the engageable element comprising a nut threaded on the threaded shank of the bolt.

* * * * *